United States Patent
Raab et al.

[19]

[11] Patent Number: 6,151,789
[45] Date of Patent: Nov. 28, 2000

[54] ADJUSTABLE HANDGRIP FOR A COORDINATE MEASUREMENT MACHINE

[75] Inventors: Simon Raab, Maitland; John Bodjack, Orlando, both of Fla.

[73] Assignee: Faro Technologies Inc., Lake Mary, Fla.

[21] Appl. No.: 09/108,282

[22] Filed: Jul. 1, 1998

[51] Int. Cl.[7] .................................................. G01B 5/008
[52] U.S. Cl. .................................................. 33/503; 81/44
[58] Field of Search ........................... 33/503, 504, 505, 33/1 M, 556, 558, 559, 561; 81/44, 487, 491, 489

[56] References Cited

U.S. PATENT DOCUMENTS

| 4,154,239 | 5/1979 | Turley | 128/217 |
|---|---|---|---|
| 4,196,742 | 4/1980 | Owen, Jr. | 135/71 |
| 4,798,185 | 1/1989 | Driggers | 123/400 |
| 4,958,407 | 9/1990 | Johnson | 81/491 |
| 5,049,012 | 9/1991 | Cavedo . | |
| 5,161,293 | 11/1992 | Ebbert | 29/242 |
| 5,297,445 | 3/1994 | Chen . | |
| 5,402,582 | 4/1995 | Raab | 33/504 |
| 5,425,285 | 6/1995 | Cheng . | |
| 5,829,148 | 11/1998 | Eaton | 33/503 |

FOREIGN PATENT DOCUMENTS 0 249 037 A2   12/1987   European Pat. Off. .
0 466 534 A1    1/1992   European Pat. Off. .

*Primary Examiner*—Diego Gutierrez
*Assistant Examiner*—Faye Francis
*Attorney, Agent, or Firm*—Cantor Colburn LLP

[57] ABSTRACT

A novel adjustable hand grip device for use with a three dimensional coordinate measurement system provides an ergnomically formed pistol grip rotatably positioned on a manually manipulated multijointed measuring arm allowing a plurality of angular positions convenient to an operator. The adjustable hand grip includes a clamp for releasably securing the device n a preselected position. An embodiment of the present invention includes a ball and detent device for releasably positioning the hand grip in a plurality of preselected positions. In yet another embodiment the hand grip device includes a swivel joint allowing rotation of the pistol grip relative to the clamp.

13 Claims, 2 Drawing Sheets

6,151,789

ADJUSTABLE HANDGRIP FOR A COORDINATE MEASUREMENT MACHINE

FIELD OF INVENTION

This invention relates generally to three dimensional coordinate measuring machines (or CMM's). More particularly, this invention relates to a new and improved Adjustable Handgrip for a three dimensional CMM which reduces operator fatigue and facilitates use.

BACKGROUND OF INVENTION

It is well known in the art to utilize a CMM to measure objects in a space in terms of their X, Y, and Z coordinates commonly referring to length, width and height. Advancement in the art has led to lightweight portable CMM's well suited for general industrial applications. Such a CMM is disclosed in U.S. Pat. No. 5,402,582 which is commonly assigned to the assignee hereof and incorporated herein by reference. Three dimensional objects are described in terms of position and orientation; that is, not just where an object is but in what direction it points. The orientation of an object in space can be defined by the position of three points on the object. Orientation can also be described by the angles of alignment of the object in space. The X,Y, and Z coordinates can be most simply measured by three linear scales. In other words, if you lay a scale along the length, width and height of a space, you can measure the position of a point in the space.

Presently, coordinate measurement machines or CMM's measure objects in a space using three linear scales. Coordinate measuring machines of the prior art comprise a multijointed (preferably six joints) manually positional measuring arm for accurately and easily measuring a volume which typically comprises a sphere preferably ranging from six to eight feet in diameter (but which may also cover diameters more or less than this range). In addition to the measuring arm CMM's of the prior art employ a controller (or serial box) which acts as the electronic interface between the arm and a host computer which displays menu prompts and outputs to an operator. The mechanical measuring arm used in CMM's generally comprise a plurality of transfer housings (with each transfer housing comprising a joint and defining one degree of rotational freedom) and extension members attached to each other with adjacent transfer housings being disposed at right angles to define a movable arm preferably having five or six degrees of freedom. Each transfer housing includes measurement transducers. In addition, each transfer casing includes visual and audio endstop indicators to protect against mechanical overload due to mechanical stressing.

Measurement arms for CMM's include a probe handle assembly at the operator end. Probe handle assemblies of the prior art include hand grips that are held by an operator as either a pencil or pistol grip and sometimes possess two switches for the attachment of optional electronics and/or a threaded mount for receiving a variety of probes. Because the CMM is a manual measurement device, the user must be capable of moving the arm using the handgrip in the taking of measurements and then confirming to CMM whether the measurement is acceptable or not. Hand grips are presently rigidly mounted to the probe end handle assemblies and are typically arranged for use by a right handed operator. Although these hand grips function adequately for manipulating the arm they can increase the fatigue of operator and prove inconvenient during the taking and confirming of measurements.

A variety of probes may be threaded to a probe handle assembly such as a hard ¼ inch diameter ball probe or a point probe is shown. The probes are typically threadably mounted to mount which in turn, is threadably mounted to a probe housing and may also include a plurality of flat surfaces for facilitating engagement and disengagement of the probes using a wrench. The use of different probes with prior art hand grips also may increase the level of fatigue and operator difficulties.

What is needed is an multi positionable ergonomically shaped hand grip capable of adjustment for a variety of operators.

SUMMARY OF THE INVENTION

The above discussed and other drawbacks and deficiencies of the prior art are overcome or alleviated by the present invention. In accordance with the present invention a novel adjustable hand grip device for use with a three dimensional coordinate measuring machine (CMM) comprises a clamp based ergonomically formed pistol grip rotatably positioned at the probe end of the arm.

The adjusting hand grip clamps onto a shaft portion of the probe end assembly and allows for positioning of the handle in a plurality of angular locations about the assembly. An embodiment of the present invention utilizes a bolt disposed within the handle to releasably secure the handle to the shaft. Another embodiment of the present invention includes a number of detents positioned in the clamp portion of the adjusting hand grip to engage a spring based ball disposed in the annular portion of the assembly to releasably secure the adjustable hand grip in preselected angular positions. The adjusted hand grip of the present invention includes a pistol type grip which is ergonomically formed to facilitate grip by an operator. An embodiment of the present invention further includes a swivel joint mounting the pistol grip to the handle assembly to allow rotational movement of the pistol grip relative to the clamp.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE EMBODIMENT

Figure 1:
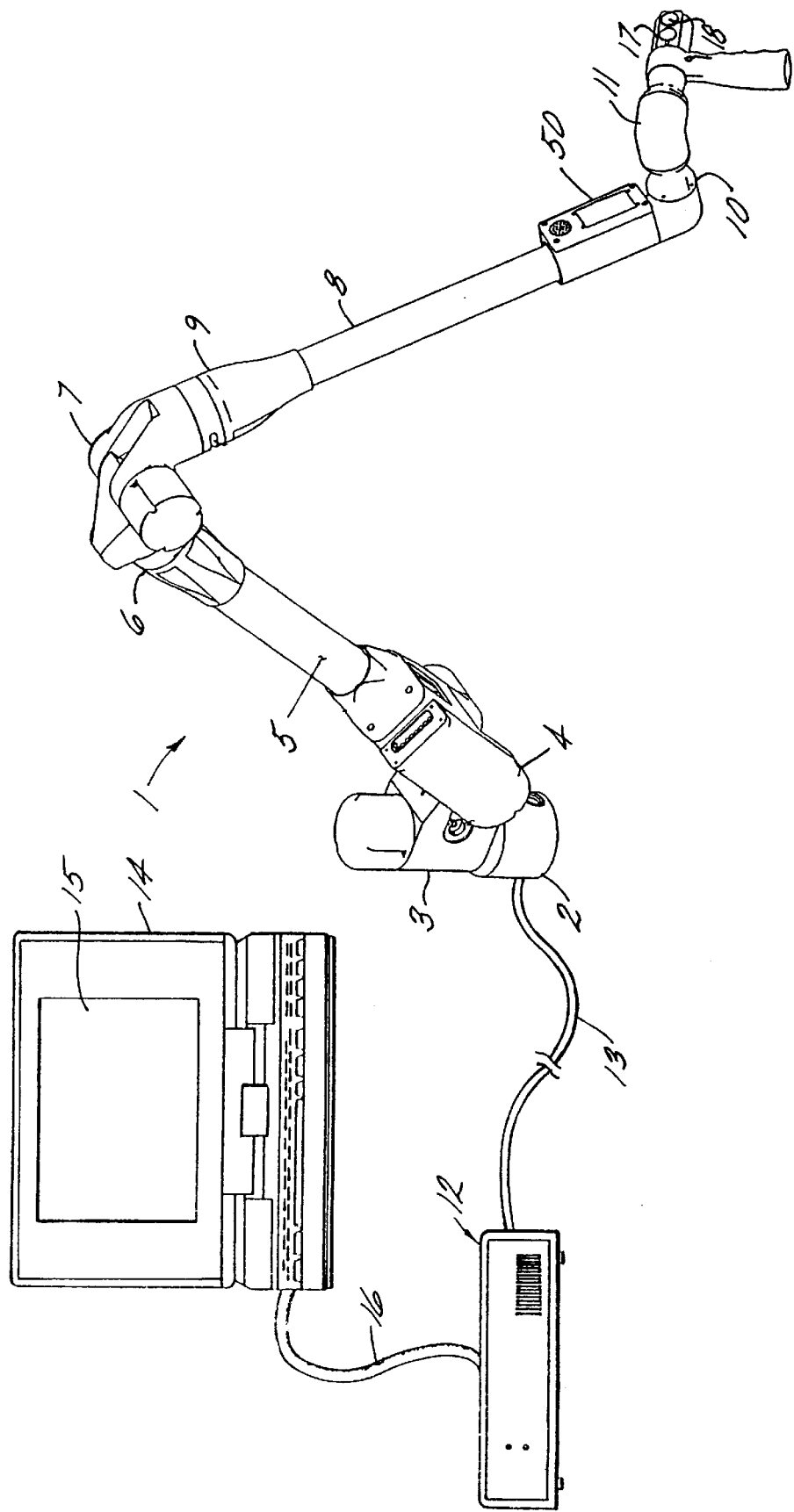
FIG. 1 is an isometric view of a three dimension coordinate measurement system incorporating an adjustable handgrip of the present invention.

Referring to FIG. 1 a multi jointed manually operated arm for use with a coordinate measuring machine (CMM) is shown generally as 1. In general terms, arm 1 is comprised of a base 2 connected to a first set of transfer housings 3, 4, a first extension member 5 rigidly attached to the first set of transfer housings and a second set of transfer housings 6,7 and a third set of transfer housings 9, 10 disposed between a second extension 8 with transfer housing 9 attached to transfer housing 7. The sets of transfer housings are generally pairs of rotatable joints positioned transverse to one another and, as in the prior art, have position sensing transducers disposed therein (not shown). Mounted at the end of arm 1 and extending from transfer housing 10 is probe handle assembly 11 including data switch buttons 17, 18 and adjustable handgrip 70. As in the prior art arm 1 electrically communicates with serial box 12 via cable 13 which communicates with electronically with host computer 14 having display 15 via cable 16.

In accordance with the present invention, the embodiment of FIG. 1 shows, by way of example, adjustable hand grip 70 disposed on arm 1 at probe handle assembly 11 in the vicinity of an operator (not shown) manipulating the arm. Adjusting hand grip 70 may be positioned at a plurality of angular positions about probe handle assembly 11 convenient to the operator and as described herein below.

Figure 2:
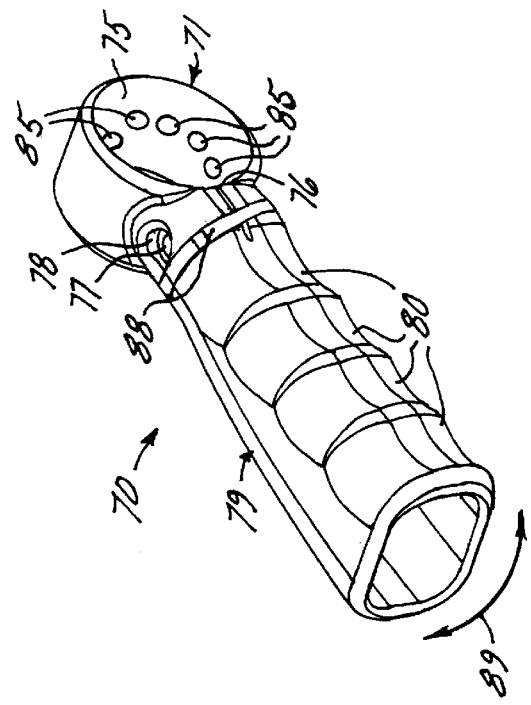
FIG. 2 is an isometric view of a handle probe assembly and an adjustable handgrip of the present invention.

Referring to FIG. 2 adjustable hand grip 70 is disposed on probe handle assembly 11 by clamp 71 and releasably secured in a preselected angular position by clamping bolt 72. Handgrip 70 is angularly adjustable about probe handle assembly 11 in the direction represented by arrow 73. In an embodiment of the present invention clamping bolt 72 is comprised of a hollow head cap screw which when loosened by an operator partially releases the clamping forces of clamp 71 allowing rotation of handgrip 70 in the direction of arrow 73. Once handgrip 70 is rotated to a position convenient to the operator bolt 72 is tightened producing a clamping force by clamp 71 against shaft 74 of probe handle assembly 11 thereby securing the handgrip in an angular position.

Figure 3:
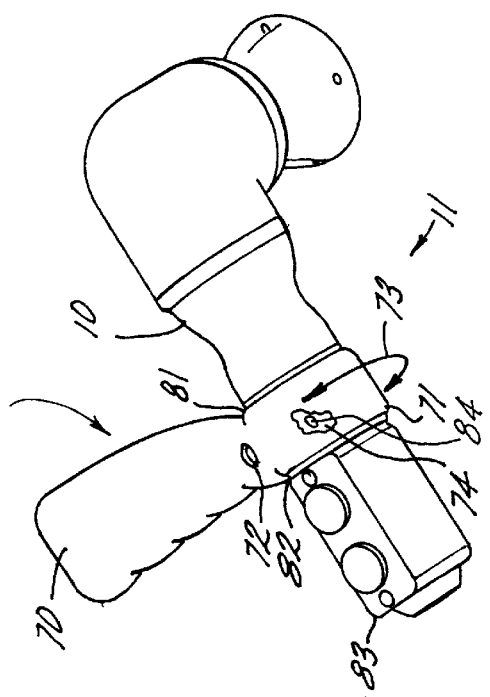
FIG. 3 is an isometric view of an adjustable handgrip showing the clamp and pistol grip.

The details of handgrip 70 will now be explained with reference to FIG. 3 wherein the preferred embodiment is formed from a single piece of molded plastic. In the embodiment shown clamp 71 includes collar 75 which is sized to rotate easily about shaft 74 and further includes split line 76. Split line 76 allows collar 75 to be reduced in size when bolt 72 is tightened as described herein above to provide a clamping force about shaft 74. In a preferred embodiment handgrip 70 includes a bolt hole 77 having a clearance diameter on the upper portion of the handgrip as viewed in FIG. 3 and an integrally threaded portion on the bottom portion for threadably receiving socket head cap bolt 72. Also located in the upper portion of bolt hole 77 is counterbore 78 for receiving the head of socket head cap bolt 72. In a less preferred embodiment a recess (not shown) is formed in the lower portion of bolt hole 77 to receive a standard hex nut to threadably engage socket head cap bolt 72 as an alternative to the integrally threaded portion.

It is an important feature of the present invention that handgrip 70 includes pistol grip 79 integrally molded from a lightweight plastic material having a hollow cross-section to reduce the overall weight of the handgrip. Also integrally molded in pistol grip 79 are a plurality of ergonomicaly shaped and located finger positions 80. Finger positions 80 accept the four fingers of one hand of an operator to allow the manipulation of arm 1 with a relaxed grip pressure over a handle of the prior art. By reducing the grip pressure required of the operator overall fatigue is reduced and ease of operation is enhanced.

Adjustable hand grip 70 is installed on handle probe assembly as shown in FIG. 2 by first installing thrust washer 81 onto shaft 74 against wrist component 10 and then sliding the handgrip onto the shaft. A second thrust washer 82 is then installed onto shaft 74 and button assembly 83 is then secured to shaft 74 as is known thereby securing handgrip 70 in an axial direction along the shaft. In a preferred embodiment thrust washers 81, 82 are comprised of a self lubricating plastic material such as Teflon or Delron. Handgrip 70 is angularly positioned about shaft 74 in the direction indicated by arrow 73 by first loosening screw 72 with a suitable wrench (not shown) rotating the handle to the desired position and then tightening the screw to releasably secure the desired position.

Figure 4:
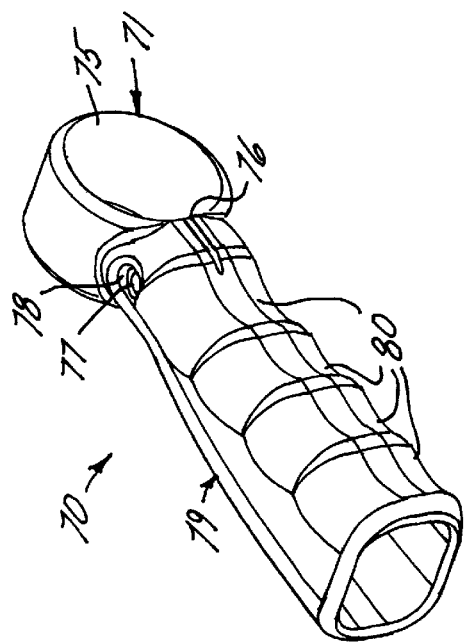
FIG. 4 is an isometric view of an adjustable handgrip showing the detents and swivel joint.

Another embodiment of the present invention is shown in FIG. 4 wherein handgrip 70 includes detents 85 positioned at predetermined locations about the interior of collar 75. Detents 85 cooperate with a spring biased ball 84 positioned on shaft 74 (see FIG. 2) to releasably secure a handgrip 70 using the ball 84 and detents 85 as is known. In an embodiment eight detents 85 are positioned equally spaced about collar 75 to provide eight different angular locations for handgrip 70 at 45 degree angular increments. In this particular embodiment clamping bolt 72 is left relatively loose to allow for indexing from detent to detent or can be tightened to allow for near infinated secure positioning of handgrip 70 as described herein above.

Still referring to FIG. 4 another embodiment of the present invention is how including swivel joint 88 positioned between aperture 78 and pistol 79. Swivel joint 88 allows rotational positioning of pistol grip 79 relative to clamp 71 in the directions represented by arrow 89.

What is claimed is:

1. An adjustable handgrip for use in a three dimensional coordinate measuring system having an arm moveable within a selected volume, the arm having a probe end comprising a shaft, the adjustable handgrip comprising:

a pistol grip having a clamp disposed at an end thereof, the clamp for engaging the shaft;

an aperture disposed in the pistol grip and extending therethrough transverse to the clamp;

a slot disposed within the pistol grip extending from the clamp positioned transverse to and distending past the aperture; and wherein the aperture receives a fastener for contracting the pistol grip into the slot and biasing the clamp about the shaft releasably securing the handgrip on the shaft in a predetermined position.

2. The adjustable hand grip as set forth in claim 1 wherein the pistol grip is comprised of an elongated hollow body.

3. The adjustable hand grip as set forth in claim 1 wherein the aperture includes a clearance portion for receiving the fastener therein and a threaded portion for threadably engaging the fastener therein.

4. The adjustable hand grip as set forth in claim 1 wherein the pistol grip is comprised of:

an elongated hollow body; and the aperture having a clearance portion rotatably receiving the fastener therein and a threaded nut threadably engaging the fastener therein.

5. The adjustable handgrip as set forth in claim 4 wherein the pistol grip is attached to the clamp by a joint positioned between the clamp and the aperture allowing infininate rotational positioning of the grip relative to the clamp.

6. The adjustable handgrip as set forth in claim 1 wherein the pistol grip further comprises a plurality of ergonomically shaped and located contours to facilitate the hand gripping of the pistol grip.

7. The adjustable handgrip as set forth in claim 6 wherein the contours comprise four detents for receiving the fingers of a hand.

8. The adjustable handgrip as set forth in claim 1 wherein the fastener is a bolt.

9. The adjustable handgrip as set forth in claim 8 wherein the bolt is a hollow head cap screw.

10. An adjustable handgrip for use in a three dimensional coordinate measuring system having an arm moveable within a selected volume, the arm having a probe end comprising a shaft positioned between the arm and a removable button assembly, the adjustable handgrip comprising:

a pistol grip having a clamp rigidly disposed at an end thereof, the pistol grip comprised of an elongated hollow body and including an aperture disposed near the clamp end and extending therethrough transverse to the clamp the aperture having a clearance portion and a threaded portion, the clamp disposed on the shaft and a bolt disposed within the aperture engaging the threaded portion releasably securing the handgrip on the shaft in a predetermined position, and a slot extending from the clamp within the elongated hollow body positioned transverse to and distending past the aperture.

11. The adjustable handgrip as set forth in claim 10 wherein the handgrip is disposed between the arm and the button assembly and further comprises a pair of plastic thrust washers positioned on either side of the clamp.

12. An adjustable handgrip for use in a three dimensional coordinate measuring system having an arm moveable within a selected volume, the arm having a probe end comprising a shaft positioned between the arm and a removable button assembly, the shaft having a spring biased ball disposed therein, the adjustable handgrip comprising:

a pistol grip comprised of an elongated hollow body having a collar rigidly disposed at an end thereof, the collar having a plurality of detents angularly spaced on an inside surface; and the pistol grip disposed on the shaft such that one of the detents receives the spring biased ball thereby releasably securing the handgrip in a predetermined angular position.

13. The adjustable handgrip as set forth in claim 12 wherein the handgrip is disposed between the arm and the button assembly and further comprises a pair of plastic thrust washers positioned on either side of the collar.

* * * * *